E. FROUK.
NUT LOCK.
APPLICATION FILED MAR. 4, 1912.
1,046,580.
Patented Dec. 10, 1912.
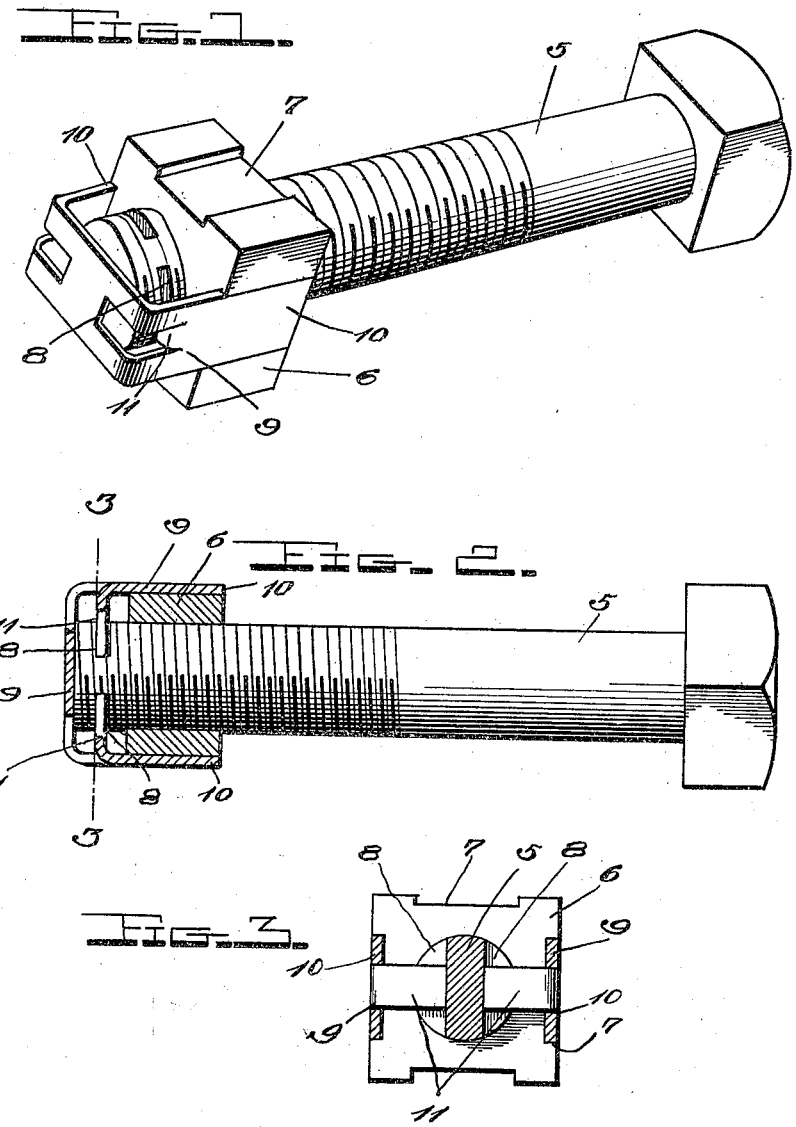
Witnesses
Chas. R. Greisbauer.
G. B. Norton.
Inventor
Eugene Frouk,
By Watson E. Coleman
Attorney

UNITED STATES PATENT OFFICE.

EUGENE FROUK, OF BOWIE, COLORADO.

NUT-LOCK.

1,046,580.  Specification of Letters Patent.  Patented Dec. 10, 1912.

Application filed March 4, 1912. Serial No. 681,372.

*To all whom it may concern:*

Be it known that I, EUGENE FROUK, a citizen of the United States, residing at Bowie, in the county of Delta and State of Colorado, have invented certain new and useful Improvements in Nut-Locks, of which the following is a specification, reference being had to the accompanying drawings.

This invention relates to improvements in nut locks and has for its object to provide a simple, efficient and easily applied device of this character whereby the nut may be securely locked upon the bolt.

Another object of the invention is to provide a lock for nuts consisting of a single element which may be readily disengaged from the bolt and nut so that the nut may be removed without destroying the continued usefulness of the locking elements.

A further object of the invention is to provide a very simple locking device for nuts which may be manufactured at very small cost and is extremely strong and durable in practical use.

With the above and other objects in view, the invention consists of the novel features of construction, combination and arrangement of parts hereinafter fully described and claimed, and illustrated in the accompanying drawings, in which—

Figure 1 is a perspective view showing my improved locking device applied to a nut or bolt; Fig. 2 is a longitudinal section; and Fig. 3 is a transverse section taken on the line 3—3 of Fig. 2.

Referring in detail to the drawing, 5 designates a bolt having one end of its shank threaded to receive the nut 6, the other end of said bolt being provided with a suitable head of any desired form. While the nut shown in the drawing is of rectangular form in plan, it will be understood that my invention is also applicable to nuts of hexagonal, octagonal or any other polygonal shape. Each of the side faces of the nut 6 is provided with a shallow recess 7 and the extreme end of the bolt is provided at diametrically opposite points with transverse grooves 8.

The locking device proper consists of a single length of resilient sheet metal 9 which in its normal condition assumes a substantially U-shaped or bowed form to provide the parallel yieldably spaced portions 10 which are adapted to be received in the shallow recesses 7 in the opposite faces of the nut 6. Upon opposite sides of the central portion of the plate 9 the same is provided with cut-out portions which are extended inwardly between the arms 10 and disposed in a plane at right angles thereto to form the tongues 11. These tongues are comparatively rigid and the inner ends thereof are adapted to be received in the transverse grooves 8 in the end of the bolt. The locking element is applied to the nut and bolt in the following manner.

The spring plate 9 is disposed over the end of the bolt 5, the arms 10 thereof being forced apart and seated in the recesses 7 in opposite sides of the nut 6. The tongues 11 are disposed in the transverse grooves 8 of the bolt when the arms of the locking element are released, the intermediate curved portion of the locking plate extending around the extremity of the bolt 5. It will be understood that the arms 10 of the locking plate are of sufficient length so that they will engage in the recesses of the nut and the tongues 11 will be disposed in the grooves of the bolt, irrespective of the position of the nut upon said bolt. In this manner it will be seen that the turning movement of the nut upon the bolt is absolutely prevented and said nut is securely held in its adjusted position. The tongues 11 of the locking plate effectually prevent any longitudinal movement of the spaced ends of said plate with relation to the nut so that the ends of the plate at all times remain in close clamping engagement with the sides of the nut and seated in the recesses 7 thereof.

From the foregoing it is thought that the construction and manner of application of my improved nut lock will be fully understood.

The device is extremely simple and may therefore, be manufactured at small cost. The locking elements may also be easily and quickly applied to or removed from the nut and bolt and are extremely efficient in practical use.

The locking plate may be made in various forms and sizes for application to various sized nuts and bolts. The invention is also susceptible of a great many other minor modifications which may be resorted to without departing from the essential feature or sacrificing any of the advantages of the invention.

Having thus described the invention what is claimed is:—

The herein described nut lock comprising in combination, a bolt provided with transverse grooves in its threaded portion at diametrically opposite points and contiguous to the end of the bolt, a nut threaded upon said bolt and having grooves in opposite faces, a locking member formed from a single length of sheet metal bent into substantially U-shaped form and having its intermediate portion disposed across the end of the bolt, the parallel arms of said locking member extending in parallel relation to the longitudinal axis of the bolt and in spaced relation to the periphery thereof, the extremities of said arms being adapted for engagement in the grooves of said nut, and tongues cut out of the intermediate portion of said locking member and the arms thereof, and extending inwardly from said arms in a plane at right angles to the longitudinal axis of the bolt, the ends of said tongues being adapted for engagement in the transverse grooves of the bolt to hold said bolt against turning movement in the nut.

In testimony whereof I hereunto affix my signature in the presence of two witnesses.

EUGENE FROUK.

Witnesses:
C. C. HAWKINS,
J. D. HAWKINS.

---

Copies of this patent may be obtained for five cents each, by addressing the "Commissioner of Patents, Washington, D. C."